United States Patent [19]
Drake

[11] 3,792,777
[45] Feb. 19, 1974

[54] LOCK FOR HINGED RACK
[75] Inventor: King B. Drake, Chatsworth, Calif.
[73] Assignee: Dracon Industries, Chatsworth, Calif.
[22] Filed: May 22, 1972
[21] Appl. No.: 255,423

Related U.S. Application Data
[63] Continuation-in-part of Ser. No. 15,506, March 2, 1970, Pat. No. 3,664,514.

[52] U.S. Cl. .................................. 211/169, 16/144
[51] Int. Cl. ............................................ A47f 5/12
[58] Field of Search. 211/169, 169.1, 4, 86; 16/144, 16/143, 146, 141, 147, 139; 292/DIG. 9, DIG. 17

[56] References Cited
UNITED STATES PATENTS
| 71,135 | 11/1867 | Charantre | 16/144 |
|---|---|---|---|
| 579,277 | 3/1897 | Lord et al. | 16/146 UX |
| 1,171,188 | 2/1916 | Goss | 16/144 |
| 2,024,039 | 12/1935 | Harting | 16/144 UX |
| 2,730,322 | 1/1956 | Haberland et al. | 211/169 X |
| 3,468,429 | 9/1969 | Drake | 211/169 |

FOREIGN PATENTS OR APPLICATIONS
| 1,042,290 | 9/1966 | Great Britain | 16/144 |
|---|---|---|---|
| 8,400 | 6/1900 | Norway | 16/144 |

Primary Examiner—Ramon S. Britts
Attorney, Agent, or Firm—Allan M. Shapiro

[57] ABSTRACT
A rack for heavy equipment is hinged on a post and the lock is secured therebetween. A finger extends from the rack into an opening in the post and engagement means secures the finger with respect to the post to lock the rack with respect thereto. The finger is a curved channel having openings in its web and the engagement means includes a plunger which selectively engages the web openings for locking the position of the rack with respect to the post. The engagement means is provided with selectively operable latch means for holding it in an unlocked position.

8 Claims, 8 Drawing Figures

LOCK FOR HINGED RACK

CROSS-REFERENCE

This application is a continuation-in-part of copending U. S. Patent Application entitled "Lock For Hinged Rack" filed Mar. 2, 1970, Ser No. 15,506, now U.S. Pat. No. 3,664,514, granted May, 23, 1972.

BACKGROUND OF THE INVENTION

1. Field of the Invention

This invention is directed to a lock for a hinged rack and, particularly, a lock which can hold or retain a hingedly-mounted rack for heavy equipment in any desired position.

2. Description of the Prior Art

Heavy equipment is employed in many different situations. In a number of these situations, maintenance requirements call for access to both sides of the equipment. Such is especially true when the equipment is electrical in nature, and electric connections or components are accessible from both sides of the equipment. Thus, the equipment is mounted in a hinged rack so that the equipment may be hingedly swung for access to both sides thereof. In laboratories where racks of electronic equipment are employed, and particularly in telephone situations wherein switching relays and other components necessary for telephonic communication are secured into rack configuration, such panels are most convenient and space-saving when hingedly mounted. Especially in the telephone field where auxiliary equipment is employed in connection with terminal wiring, reliability is so great that access to the equipment is not often required, but is usually required only for reconnection of subscribers' telephones. Thus, equipment can be positioned in such a manner that it is close to an adjacent wall to conserve floor space and still have the side toward the wall available for access through the employment of hinges on the rack of the telephone equipment. By this means, equipment may be swung out from the wall for access to the back thereof, and swung back to the wall for conservation of space. Such a hinged equipment rack is exemplified by that disclosed in U.S. Pat. No. 3,468,429 entitled "Telephonic Equipment Rack."

SUMMARY OF THE INVENTION

In order to aid in the understanding of this invention, it can be stated in essentially summary form that it is directed to a lock for a hinged rack. The rack is hingedly mounted on a post. The lock comprises a finger which is mounted upon the rack and extends into an opening in the post. Post-mounted engagement means locks the finger with respect to the post, thus locking the rack with respect to the post. The finger comprises an arcuate finger having holes therethrough, and the engagement means on the post includes a rod having a plunger which engages the holes. The rod is arranged and provided with selectively operable latch means for engaging the post so as to hold the plunger in an unlocked position when desired.

Accordingly, it is an object of this invention to provide a lock for a hinged rack, and particularly a hinged rack of heavy equipment so that the heavy equipment rack may be locked in any desired position. It is a further object of this invention to provide for a finger secured to the rack and engagement means secured to the post so that, when the engagement mean engages the finger, the rack is secured with respect to the post. It is still another object to provide a finger which has holes therein, and the engagement means selectively engages a hole to lock the finger with respect to the post. It is a further object to provide a plunger which selectively engages in the holes in the finger to selectively lock the finger with respect to the post. It is another object to provide the plunger with latch means for selectively engaging the post to latch the plunger in a finger-unlocked position.

Still other objects, features and attendant advantages of the present invention, together with various modifications, will become apparent to those skilled in the art from a reading of the following detailed description of the preferred embodiments, constructed in accordance therewith, taken in conjunction with the accompanying drawings wherein like numerals designate like parts in the several figures.

DESCRIPTION OF THE PREFERRED EMBODIMENT

Figure 1:
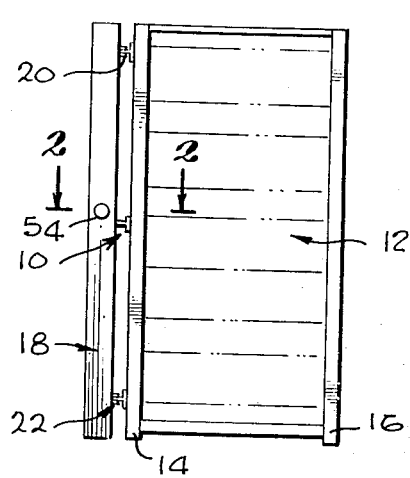
FIG. 1 is a front elevational view of a hinged rack, showing the improved lock of this invention in association therewith.

Referring to FIG. 1 initially, the lock of this invention is generally indicated at 10. Lock 10 is particularly useful for the securement into angular position of a rack 12 which is mounted in hinged fashion upon a fixed frame or post. In the present case, rack 12 is a rack of telephone equipment of the type illustrated in U. S. Pat. No. 3,468,429. Rack 12 has upright frame members 14 and 16 which define the sides of the rack. As is illustrated, frame member 14 is mounted to post 18 by means of hinges 20 and 22. Thus, rack 12 is hingedly mounted with respect to post 18 upon the axis of hinges 20 and 22.

Referring to the drawings, the preferred embodiment of the lock 10 is seen to comprise finger 24 and locking means 26. Finger 24 has a base 28 which is secured to web 30 of frame member 14 by any conventional means, such as the bolts illustrated in FIGS. 2, 3 and 4. The principal length of finger 24 is radially positioned with respect to the axis of hinge 22 as defined by hinge pin 32, and extends substantially 90° circumferentially with respect to that axis. The cross-section of finger 24 is in the form of a sloped channel having flanges 34 and 36 and web 38. The flanges are directed radially outward with respect to the web and serve as guides for the locking means 26, as is hereinafter described. A series of radial holes 40 are formed through web 38. The holes are spaced along the circumferential length of the web in such manner as to provide appropriate locking angles for frame member 14 with respect to post 18. Finger 24 extends into the interior of post 18 by passing freely through a hole 43 in side wall 42 of post 18.

Figure 2:
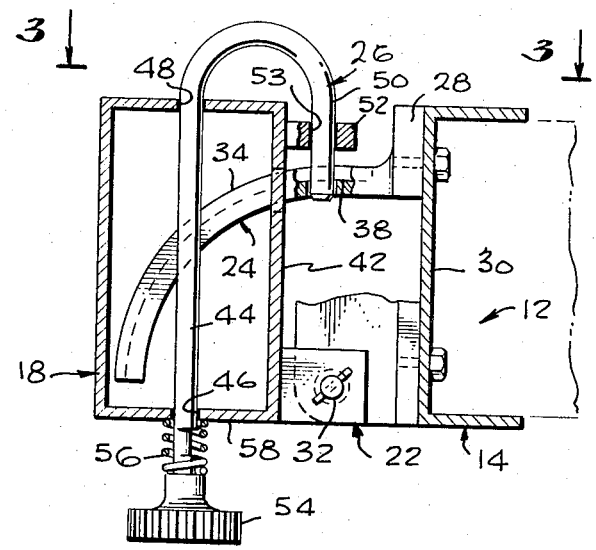
FIG. 2 is an enlarged fragmentary horizontal section through the rack and associated post taken along line 2—2 of FIG. 1.
Figure 3:
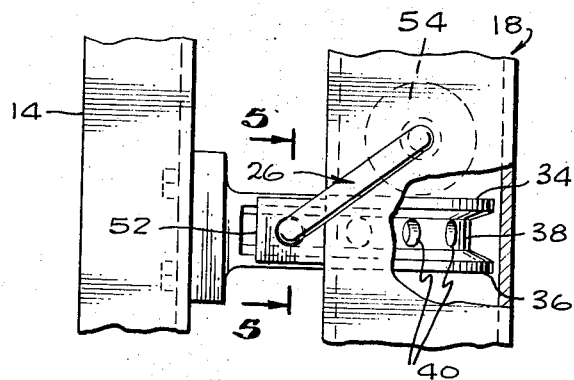
FIG. 3 is a rear elevational view, with parts broken away, taken generally along the line 3—3 of FIG. 2.
Figure 5:
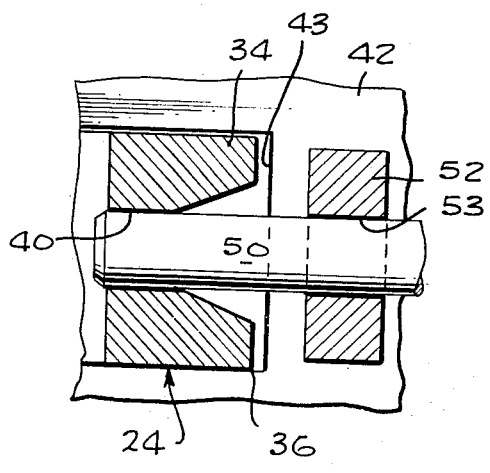
FIG. 5 is a fragmentary enlarged sectional view, taken generally along the line 5—5 in FIG. 3, showing the plunger and finger in the locked position.
Figure 6:
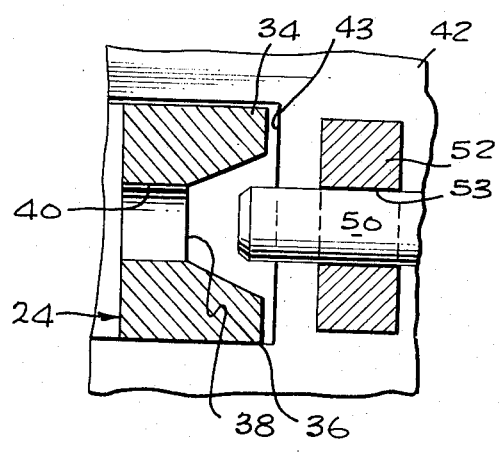
FIG. 6 is a view similar in aspect to FIG. 5, taken generally along the line 6—6 in FIG. 4, showing the plunger and finger in the unlocked position.

Locking means 26 is in the form of operating rod 44, which is guided in holes 46 and 48 in the front and back walls respectively of post 18 so that it is free to move substantially only along its own axis. The portion of operating rod 44 which is behind post 18 is bent into a U-shape to form a lock pin or plunger 50. Plunger 50 extends through lock member or guide 52 via a hole 53 which is aligned with the holes 40 in web 38. The front end of operating rod 44 carries knob 54, and compression spring 56 is positioned between knob 54 and the front surface of the post's front wall 58. Thus, operating rod 44 is urged outwardly (downwardly as seen in FIG. 2) to urge plunger 50 into engagement with one of the holes 40. By pushing inwardly on knob 54, the plunger 50 is disengaged from the holes to permit swinging of the rack mounted on frame member 14 and, when the knob 54 is released, the spring 56 causes the plunger 50 to be urged toward return engagement with one of the holes 40. Slight swinging of the rack thereupon moves the hole 40 into alignment with the guide hole 53 and the plunger so that the plunger engages therein for locking the rack at the desired angular position. Thus, in use, the operator may merely push knob 54, swing the rack to the approximately desired position, release knob 54, and slightly rotate the rack in either direction until the plunger 50 "clicks" into a hole 40.

Figure 4:
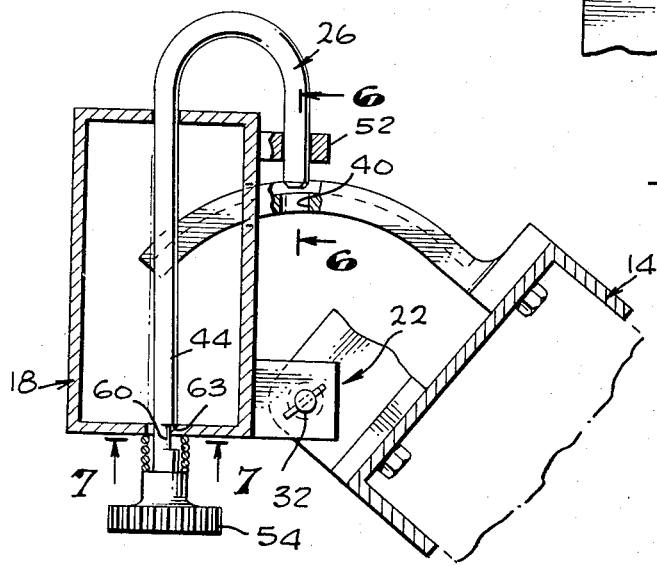
FIG. 4 is a sectional view similar to FIG. 2, showing the lock with the hinged rack in another position and the plunger latched in the unlocked position.
Figure 7:
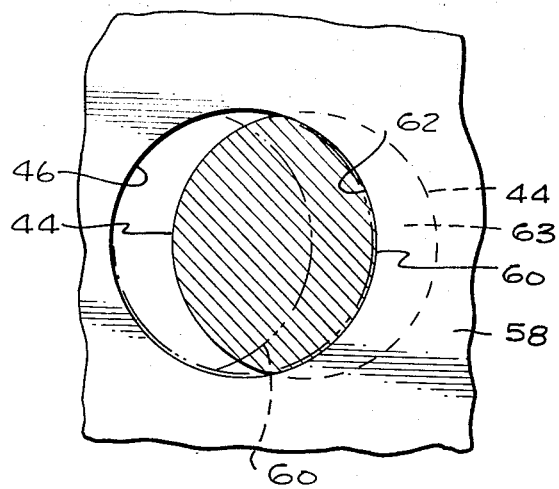
FIG. 7 is an enlarged fragmentary vertical section taken generally along line 7—7 in FIG. 4, showing the rod in latched engagement with the post.

In some situations, the operator will prefer to unlock the rack and keep it in the unlocked free-swinging condition while he works on the associated equipment. For this purpose, as best seen in FIGS. 2, 4 and 7, the rod 44 is provided with a side notch 60 adapted to receive the edge 62 of the front wall 58, which edge 62 partially defines the front hole 46 through which the rod 44 normally passes freely. The side notch 60 preferably is crescent-shaped and provides a similarly crescent shaped shoulder 63 in the rod 44 for abutment against the inner surface of the front wall 58 when the rod 44 is in the latched position illustrated in solid lines in FIGS. 4 and 7. In FIG. 4, the normal position of the rod 44 is shown in broken lines for more clearly demonstrating the canting lateral movement of the rod 44 into the latched position shown in solid lines. It will be noted that the security of the latched position is increased by the biasing force of the compressed spring 56. Release from the latched position is accomplished readily by merely moving the knob 54 to the left, as seen in FIGS. 4 and 7, until the side of the rod 44 knocks against the side of the hole 46 opposite from the hole edge 62, i.e., opposite from the notch 60, whereupon the spring 56 immediately causes withdrawal of the notch portion 60 of the rod 44 from association with the wall 58 and into the lock position illustrated in FIG. 2.

Figure 8:
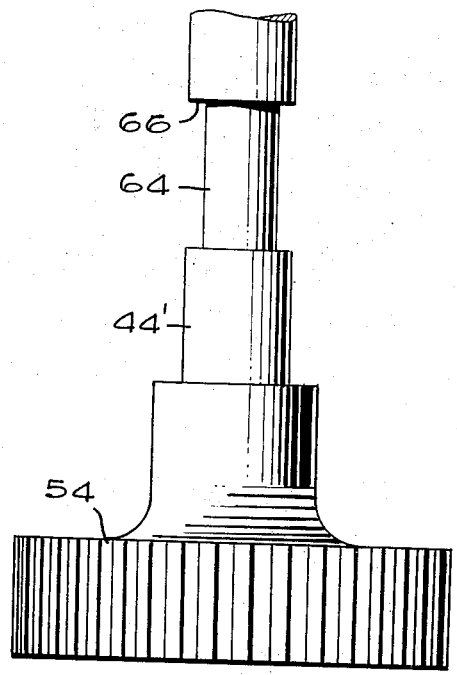
FIG. 8 is a fragmentary enlarged sectional view, similar in aspect to FIG. 2, showing a modification of the rod for latching purposes.

In the modified version of FIG. 8, the rod 44' is provided with a completely annular notch 64 in the nature of a reduced diameter portion of the rod 44' to provide an annular shoulder 66 which, like the previously described shoulder 63, is adapted to abut against the inner surface of the post wall 58 for latching the rod 44' in an unlocked position. In this version, the rod 44' may be canted in any radial direction for latching the rod, unlike the preferred embodiment in which the latching movement must be oriented to the direction of the notch 60; however, the version of FIG. 8, as compared to the preferred embodiment, has at least one disadvantage in that the release from the latched position is not as positive, i.e., the rod 44' must be centered within the hole 46 before the shoulder 66 disengages from the front wall 58, which manual centering is more difficult from an operational standpoint than the mere automatic centering achieved with the preferred embodiment in that the rod 44 is automatically centered within the hole 46 when unlatched in the manner previously described.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A lock in combination with a rack and a post, said combination comprising:

said post being positioned in generally upright orientation and it being a hollow post;

said rack having first and second upright frame members defining the sides of said rack and being structured for the mounting of equipment between said upright frame members, said first upright frame member being spaced from said upright hollow post;

upper and lower hinges positioned in said space between said post and said first frame member so that said rack can swing about a hinge axis defined by said upper and lower hinges from a position where it lies substantially in line with said post to a position where it swings in front of said post;

an arcuate finger rigidly secured to said first upright frame member of said rack and extending therefrom toward and into the hollow interior of said post, said finger, at least through a portion of its lengths, being positioned at a distance from said hinge axis and being arcuately curved substantially about said hinge axis, said finger having a plurality of spaced holes therethrough in its arcuately curved portion; and locking means on said post, said locking means including an operating rod extending through said hollow post and guided generally along its longitudinal axis by said post, a plunger on the rear end of said operating rod, said operating rod being connected so that movement along its axis causes selective locking engagement of said plunger in one of said holes, said operating rod extending adjacent the front of said post, a knob on the front of said post and a compression spring between said knob and said post so that said plunger is urged in the engagement direction by said spring, so that said locking means can be operated from the front of said post.

2. The lock of claim 1 wherein said arcuate finger is channel-shaped, having flanges and a web therebetween, said openings being positioned in said web between said flanges so that said plunger is restrained between said flanges.

3. The lock of claim 1 wherein said locking means includes a guide member secured to the exterior of said post on the hinge side of said post, said guide member having a hole therethrough for receiving said plunger, said plunger extending into a selected one of said holes in said finger exteriorly of said post when such hole is aligned with said guide member hole.

4. The lock of claim 1 wherein said rod is provided with a side notch adapted to receive a portion of said post in selectively latched engagement when said plunger is out of locked engagement with said finger holes.

5. The lock of claim 4 wherein said side notch is annular.

6. The lock of claim 4 wherein said side notch is crescent shaped whereby said latched engagement is directionally oriented.

7. The lock of claim 6 wherein said arcuate finger is channel-shaped, having flanges and a web therebetween, said openings being positioned in said web between said flanges so that said plunger is restrained between said flanges.

8. The lock of claim 6 wherein said locking means includes a guide member secured to said post, said guide member having a hole therethrough for receiving said plunger, said plunger extending into a selected one of said holes in said finger when such hole is aligned with said guide member hole.

* * * * *